Patented Jan. 22, 1946

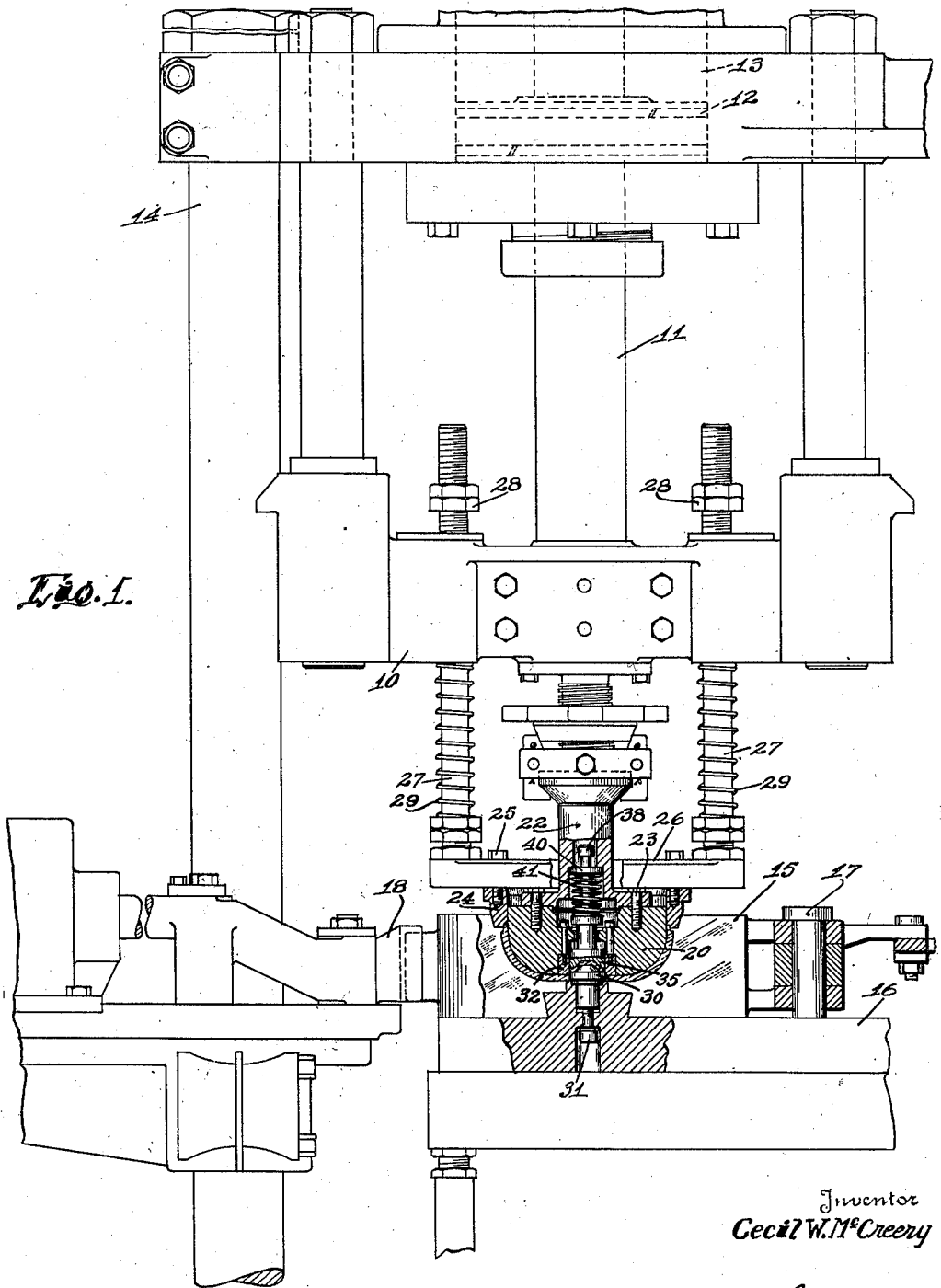

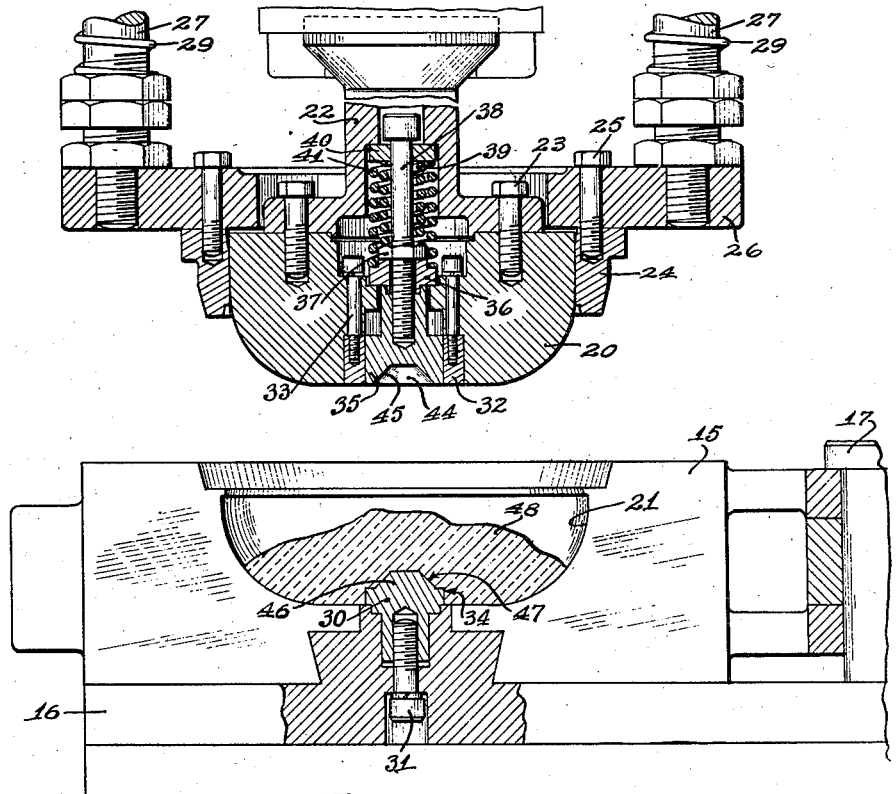
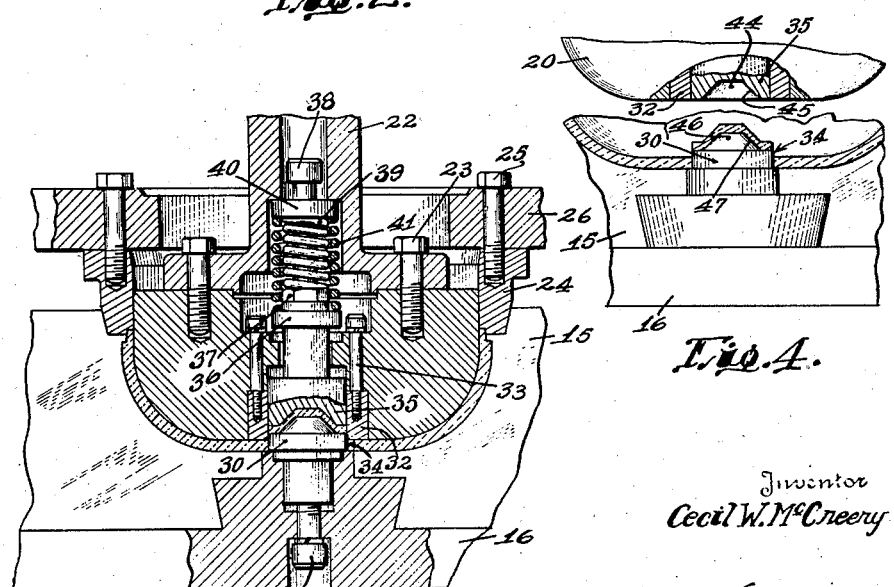

2,393,549

UNITED STATES PATENT OFFICE 2,393,549

PRESS MOLDING MACHINE

Cecil Wayne McCreery, Muncie, Ind., assignor to Owens-Illinois Glass Company, a corporation of Ohio Application April 22, 1943, Serial No. 483,992

7 Claims. (Cl. 49—73)

My invention relates to press molding machines for molding glass articles and includes means for forming apertures in the articles during the molding operation.

An object of the invention is to provide a novel apparatus for accurately cutting or forming apertures in molded articles. More particularly, the invention provides in combination with a press mold and plunger for molding hollow glass articles, auxiliary means for cutting an aperture in the molded article, concurrently with the movement of the plunger by which the article is molded.

A further object of the invention is to provide means for accurately centering the press plunger with a stationary die which cooperates therewith and thereby accurately cutting or forming an aperture in the molded article.

Other objects of the invention will appear hereinafter.

Referring to the accompanying drawings:

Fig. 1 is a part-sectional elevation of a press molding machine embodying the principles of my invention.

Fig. 2 is a part-sectional elevation showing the mold and plunger with the latter in its lifted position.

Fig. 3 is a similar view but showing the plunger lowered.

Fig. 4 is a fragmentary view showing the plunger lifted to an intermediate position following the molding operation.

Referring particularly to Fig. 1, the invention is shown as applied to and forming a part of a press molding machine which, except as to the particular mechanism for forming the apertures in the molded articles, is in the main, of conventional construction. The machine comprises a press plunger head 10 and plunger rod 11, lifted and lowered by a piston motor comprising a piston 12 which reciprocates within a cylinder 13 mounted on the machine frame 14.

A sectional mold 15 comprises mold halves or sections mounted on a mold bottom plate 16 and pivoted to swing about a pivot pin 17. The mold sections are locked together for the molding operation by a locking device 18. A press plunger 20 is connected to the head 10 for vertical reciprocating movement into and out of the mold cavity 21. A plunger stem or extension 22 is attached to the plunger by bolts 23. A pressure ring 24 which surrounds the plunger 20 is attached by bolts 25 to a plate 26 suspended from the head 10 by means of a pair of vertical rods 27 which extend through the head 10 and are slidable up and down therein, the downward movement being limited by stop nuts 28 threaded on said rods. Coil compression springs 29 on said rods are held under compression between the head 10 and the plate 26.

The parts as thus far described are of conventional construction. The mechanism for forming apertures in the molded articles in accordance with the present invention will now be described.

An anvil 30 has a stationary mounting in the base plate 16 and is secured in position therein by a cap screw 31. The plunger 20 is formed with a central opening extending vertically therethrough in which is mounted an annular shearing member or ring 32 secured by bolts 33. The anvil 30 is formed with a circular shearing edge 34 which cooperates with the shearing ring 32 as hereinafter described for shearing the glass to form an opening through the molded article.

Cooperating with the anvil 30 is an auxiliary or secondary plunger 35 mounted for limited vertical reciprocating movement within the main plunger 20. The plunger 35 is fitted to slide within the shearing ring 32 and serves, in cooperation with the anvil 30, as a means for accurately aligning the shearing ring with the anvil for the shearing operation, all as fully set forth hereinafter.

A plunger cap 36 (Fig. 2) seats on the plunger 35 and is held thereon by a lock nut 37 threaded on a stud bolt 38 which is threaded into the plunger 35. An inner coil compression spring 39, mounted on the bolt 38, is held under compression between the lock nut 37 and a washer 40 on said bolt. An outer coil compression spring 41, surrounding the spring 39, is held under compression between the washer 40 and the cap 36.

The plunger 35 is formed at its lower end with a frusto-conical recess 44 having conical or tapered walls 45. The anvil 30 is formed with a frusto-conical extension 46 having a tapered or conical surface 47, for cooperation with the conically recessed plunger 35. The inclined surfaces 45 and 47 are preferably exactly parallel so that when the plunger 35 is lowered, the extension 47 of the anvil fits accurately within the recess 44 and thus serves to accurately center and align the plunger 20, and particularly the shearing ring 32, with the anvil for the shearing operation.

The operation is as follows:

When the press head 10 is in its lifted position, a charge or gob 48 of molten glass is placed within the mold cavity 21. The head 10 is then lowered so that the pressure ring 24 is seated on the mold and the plunger 20 enters the mold cavity. The auxiliary plunger 35, as shown in Fig. 2, is in its lowermost position relative to the main plunger 20, the lower end of the auxiliary plunger being flush with the lower edge of the cutting ring 32. The main and auxiliary plungers are held in this relative position under the force of the compression springs 39, 41, until the auxiliary plunger is arrested by or seats on the anvil 30, with the projection 46 within the recess 44 of the auxiliary plunger. The frusto-conical surfaces during this movement align themselves concentrically upon the same common vertical center line. That is to say, the anvil 30 being held in fixed position, aligns the plunger 35, and with it the main plunger 20 and shearing ring 32 for the cutting operation.

As the plunger moves downward and approaches the anvil 30, the glass directly over the anvil and between it and the auxiliary plunger 35, is forced to spread out laterally, forming a comparatively thin layer between the anvil and the plunger. The resistance offered to this spreading of the glass results in an increased pressure on the upper surface area of the anvil and the bottom surface of the plunger 35 directly thereover, such area being co-extensive laterally with the area of the aperture which is formed in the molded article during the final downward movement of the main plunger. This added pressure increases as the frusto-conical surfaces approach each other. The compression force of the coil springs may be sufficient to prevent retraction of the plunger 35 within the press plunger 20 before it seats on the frusto-conical extension 46 of the anvil with the inclined wall surfaces 45 and 47 in contact with each other.

When the auxiliary plunger 35 is thus seated on the anvil and accurately centered thereon, the continued downward movement of the plunger head 20 causes the shearing ring 32 to move downwardly into shearing contact with the shearing edge 34 of the anvil 30, thereby severing the thin layer or fringe of glass remaining between the anvil and the plunger 35. The anvil and plunger are designed to provide a narrow, marginal space between their opposing flat, annular surfaces which surround the base of the projection 46. During the final downward movement of the plunger 20 after the shearing operation, the glass is forced upwardly within the mold cavity around the main plunger to the pressure ring 24, thereby completing the formation of the molded article.

Modifications may be resorted to within the spirit and scope of my invention.

I claim:

1. A press molding machine comprising a stationary mold having a mold cavity, a main plunger positioned above the said mold and mounted for movement to and from the mold, a stationary molding element projecting upwardly within the mold cavity, said plunger having an opening to receive said projection when the plunger is lowered, said plunger and said projection having cooperating shearing edges, and an auxiliary plunger mounted for reciprocation within said opening, said projecting element being positioned and arranged to provide a stop for the auxiliary plunger for arresting the auxiliary plunger when the main plunger reaches an intermediate position during its downward movement, the said projecting element and auxiliary plunger having oppositely disposed contacting tapered guiding surfaces by which the said plungers are centered relatively to the mold.

2. A press molding machine comprising a stationary mold having a mold cavity therein, a stationary anvil projecting upwardly within the mold cavity, a main press plunger movable vertically into and out of the mold cavity, said plunger having a central opening in register with the anvil, an auxiliary plunger mounted within said opening and movable up and down therein, and a compression spring holding the said auxiliary plunger in its lowered position relative to the main plunger, the auxiliary plunger and anvil having oppositely positioned cooperating tapered surfaces so positioned and arranged that they are brought together and cause the anvil to center the plungers and form a stop for the auxiliary plunger for arresting it during the downward movement of the main plunger, said anvil having a shearing edge to cooperate with the main plunger for shearing the glass surrounding the anvil.

3. A press molding machine comprising a stationary mold having a mold cavity therein, a stationary anvil projecting upwardly within the mold cavity, a main press plunger movable vertically into and out of the mold cavity, said plunger having a central opening in register with the anvil, an auxiliary plunger mounted within said opening and movable up and down therein, and a compression spring holding the said auxiliary plunger in its lowered position relative to the main plunger, said anvil being arranged and positioned to form a stop for the auxiliary plunger for arresting it during the downward movement of the main plunger, said anvil having a shearing edge to cooperate with the main plunger for shearing the glass surrounding the anvil, the anvil and auxiliary plunger having oppositely disposed frusto-conical surfaces which fit together when the auxiliary plunger is arrested during the downward movement of the main plunger and thereby provide centering means by which the auxiliary plunger is centered and aligned with the anvil, said auxiliary plunger forming a guide for the main plunger during the final downward movement of the latter.

4. A press molding machine comprising a mold having a mold cavity, an anvil mounted in position to project within the mold cavity, a main plunger movable into and out of the mold cavity and having an opening in register with said anvil, and an auxiliary plunger mounted within said opening and movable toward and from the anvil therein, said anvil being arranged to provide a stop for the auxiliary plunger, the auxiliary plunger and the anvil having cooperating tapered surfaces which are brought together and fit one within the other and thereby center the auxiliary plunger when the latter is moved into contact with the anvil.

5. The combination of a sectional mold, a bottom plate on which the mold sections are mounted to swing to and from a closed position, said mold having an upwardly facing mold cavity, an anvil mounted in said bottom plate and projecting upwardly within the mold cavity, a main plunger positioned over the mold cavity and movable up and down therein, said plunger having an opening therein, an auxiliary plunger mounted for up and down movement within said opening, and a compression spring holding the auxiliary plunger in its lowered position relative to the main plunger, said anvil being positioned in the path of the auxiliary plunger and forming a stop therefor by which the auxiliary plunger is arrested as the main plunger, during its downward movement, reaches a point near the limit of its downward movement, said anvil and auxiliary plunger having cooperating, tapered surfaces by which the auxiliary plunger is accurately centered and held during the final movement of the main plunger.

6. The combination of a sectional mold, a bottom plate on which the mold sections are mounted to swing to and from a closed position, said mold having an upwardly facing mold cavity, an anvil mounted in said bottom plate and projecting upwardly within the mold cavity, a main plunger positioned over the mold cavity and movable up and down therein, said plunger having an opening therein, an auxiliary plunger mounted for up and down movement within said opening, a compression spring holding the auxiliary plunger in its lowered position relative to the main plunger, said anvil being positioned in the path of the auxiliary plunger and forming a stop therefor by which the auxiliary plunger is arrested as the main plunger, during its downward movement, reaches a point near the limit of its downward movement, said anvil and auxiliary plunger having cooperating, tapered surfaces by which the auxiliary plunger is accurately centered and held during the final movement of the main plunger, and a shearing ring mounted in said opening in the main plunger and surrounding said auxiliary plunger, said ring having a shearing edge cooperating with the edge of said anvil for severing the glass overlying the anvil and thereby forming an opening through the molded article.

7. The combination of a sectional mold, a bottom plate on which the mold sections are mounted to swing to and from a closed position, said mold having an upwardly facing mold cavity, an anvil mounted in said bottom plate and projecting upwardly within the mold cavity, a main plunger positioned over the mold cavity and movable up and down therein, said plunger having an opening therein, an auxiliary plunger mounted for up and down movement within said opening, said anvil being positioned in the path of the auxiliary plunger and forming a stop therefor by which the auxiliary plunger is arrested as the main plunger, during its downward movement, reaches a point near the limit of its downward movement, said anvil and auxiliary plunger having cooperating, tapered surfaces by which the auxiliary plunger is accurately centered and held during the final movement of the main plunger.

CECIL WAYNE McCREERY.